US010647201B2

(12) United States Patent
Sato et al.

(10) Patent No.: US 10,647,201 B2
(45) Date of Patent: May 12, 2020

(54) DRIVE ASSIST DEVICE AND DRIVE ASSIST METHOD

(71) Applicant: SUBARU CORPORATION, Tokyo (JP)

(72) Inventors: Noeru Sato, Tokyo (JP); Takeshi Torii, Tokyo (JP); Hiroyuki Morikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/159,312

(22) Filed: Oct. 12, 2018

(65) Prior Publication Data

US 2019/0143815 A1    May 16, 2019

(30) Foreign Application Priority Data

Nov. 16, 2017 (JP) ................................ 2017-221041

(51) Int. Cl.
*B60Q 1/00* (2006.01)
*B60K 35/00* (2006.01)

(52) U.S. Cl.
CPC ...... *B60K 35/00* (2013.01); *B60K 2370/1868* (2019.05); *B60K 2370/334* (2019.05); *B60K 2370/52* (2019.05); *B60K 2370/736* (2019.05)

(58) Field of Classification Search
CPC .............. B60K 35/00; B60K 2370/736; B60K 2370/52; B60K 2370/1868; B60K 2370/334
See application file for complete search history.

(56) References Cited

U.S. PATENT DOCUMENTS

| 5,801,667 | A | * | 9/1998 | Shimizu | H04N 7/183 |
|           |   |   |        |         | 340/435 |
| 6,107,922 | A | * | 8/2000 | Bryuzgin | G08B 21/06 |
|           |   |   |        |         | 340/461 |
| 7,623,960 | B2 | * | 11/2009 | Wise | G01C 23/00 |
|           |    |   |         |      | 340/441 |
| 8,504,270 | B2 | * | 8/2013 | Busch | G08G 1/0116 |
|           |    |   |        |       | 701/117 |
| 10,181,209 | B2 | * | 1/2019 | Hiraoka | G01D 7/04 |
| 2002/0015527 | A1 | * | 2/2002 | Nambu | G06K 9/00221 |
|              |    |   |        |       | 382/218 |

(Continued)

FOREIGN PATENT DOCUMENTS

| JP | 2009-292296 A | 12/2009 |
| JP | 2011-157066 A | 8/2011 |

(Continued)

OTHER PUBLICATIONS

Han, Design of the Vehicle Driver Fatigue Monitor System Based on ARM (Year: 2015).*

(Continued)

*Primary Examiner* — Quang Pham
(74) *Attorney, Agent, or Firm* — McDermott Will & Emery LLP (57) ABSTRACT

A drive assist device includes a fatigue degree estimator and a display controller. The fatigue degree estimator estimates a fatigue degree of a driver of a vehicle. The display controller changes a display range of an optical flow to be presented to the driver, on a basis of the fatigue degree.

18 Claims, 7 Drawing Sheets

(56) References Cited

U.S. PATENT DOCUMENTS

| | | | | |
|---|---|---|---|---|
| 2002/0101354 | A1* | 8/2002 | Banas | G08B 21/06 340/576 |
| 2003/0078783 | A1* | 4/2003 | Yamamoto | B60R 25/102 704/273 |
| 2004/0201481 | A1* | 10/2004 | Yoshinori | B60H 1/00 340/575 |
| 2004/0227661 | A1* | 11/2004 | Godsy | G01S 13/325 342/70 |
| 2005/0007386 | A1* | 1/2005 | Berson | G01C 23/00 345/633 |
| 2006/0022808 | A1 | 2/2006 | Ito et al. | |
| 2006/0056384 | A1* | 3/2006 | Ishii | H04L 43/026 370/351 |
| 2006/0220915 | A1* | 10/2006 | Bauer | A61B 5/1103 340/945 |
| 2010/0253496 | A1* | 10/2010 | Nishikawa | G01D 7/00 340/441 |
| 2011/0090094 | A1* | 4/2011 | Yamada | G08G 1/095 340/905 |
| 2011/0106430 | A1* | 5/2011 | Schirmer | G01C 21/3626 701/533 |
| 2013/0009761 | A1* | 1/2013 | Horseman | A61B 5/6893 340/425.5 |
| 2013/0106844 | A1* | 5/2013 | Hong | G06T 15/04 345/419 |
| 2013/0110371 | A1* | 5/2013 | Ogawa | G08G 1/095 701/70 |
| 2013/0113910 | A1* | 5/2013 | Kim | B60K 28/066 348/77 |
| 2014/0078281 | A1* | 3/2014 | Tsou | G08B 21/06 348/78 |
| 2014/0152444 | A1* | 6/2014 | Lee | G08B 21/06 340/575 |
| 2014/0309881 | A1* | 10/2014 | Fung | B60K 28/06 701/36 |
| 2015/0087919 | A1* | 3/2015 | Johnson | A61B 5/486 600/301 |
| 2015/0109756 | A1* | 4/2015 | Choi | B60K 37/02 362/23.01 |
| 2015/0169834 | A1* | 6/2015 | Nishimura | G06Q 10/0639 702/19 |
| 2017/0028256 | A1* | 2/2017 | McCoy | A61B 5/002 |
| 2017/0127992 | A1* | 5/2017 | Takahashi | A61B 5/02438 |
| 2017/0187963 | A1* | 6/2017 | Lee | G06F 3/013 |
| 2017/0327124 | A1* | 11/2017 | Kim | B60N 2/002 |
| 2017/0347903 | A1* | 12/2017 | Nagasaki | G16H 40/63 |
| 2018/0105180 | A1* | 4/2018 | Fung | B60W 40/09 |
| 2018/0201133 | A1* | 7/2018 | Sumiya | B60K 35/00 |
| 2018/0304750 | A1* | 10/2018 | Cieler | B60K 37/06 |

FOREIGN PATENT DOCUMENTS

| | | |
|---|---|---|
| JP | 2016-000572 A | 1/2016 |
| JP | 2017-068761 A | 4/2017 |
| JP | 2017-117105 A | 6/2017 |
| JP | 2017-144772 A | 8/2017 |

OTHER PUBLICATIONS

Japanese Notice of Reasons for Refusal issued in corresponding Japanese Patent Application No. 2017-221041, dated Sep. 24, 2019, with English translation.

* cited by examiner

DRIVE ASSIST DEVICE AND DRIVE ASSIST METHOD

CROSS-REFERENCE TO RELATED APPLICATIONS

The present application claims priority from Japanese Patent Application No. 2017-221041 filed on Nov. 16, 2017, the entire contents of which are hereby incorporated by reference.

BACKGROUND

1. Technical Field

The present invention relates to a drive assist device and a drive assist method.

2. Related Art

Japanese Unexamined Patent Application Publication (JP-A) No. 2016-572 describes increasing the number of light spots projected on a front windshield in a manner that they move in a traveling direction frontward from the near side along a lane on which a vehicle travels in the case where estimated driving intention exists in an acceleration assist region, and increasing the number of projected light spots in a manner that they move in a direction opposite to the traveling direction toward the near side from the front along a lane on which the vehicle travels in the case where estimated driving intention exists in a deceleration assist region.

SUMMARY OF THE INVENTION

An aspect of the present invention provides a drive assist device including: a fatigue degree estimator configured to estimate a fatigue degree of a driver of a vehicle; and a display controller configured to change a display range of an optical flow to be presented to the driver, on a basis of the fatigue degree.

Another aspect of the present invention provides a drive assist device including: a vehicle speed acquirer configured to acquire a vehicle speed; and a display controller configured to change a movement speed or a display range of an optical flow to be presented to a driver, in a case where the vehicle speed falls outside a predetermined range.

Another aspect of the present invention provides a drive assist method including: estimating a fatigue degree of a driver of a vehicle; and changing a display range of an optical flow to be presented to the driver, on a basis of the fatigue degree.

Another aspect of the present invention provides a drive assist method including: acquiring a vehicle speed; and changing a movement speed or a display range of an optical flow to be presented to a driver, in a case where the vehicle speed falls outside a predetermined range.

Another aspect of the present invention provides a drive assist device including circuitry configured to estimate a fatigue degree of a driver of a vehicle, and change a display range of an optical flow to be presented to the driver, on a basis of the fatigue degree.

Another aspect of the present invention provides a drive assist device including circuitry configured to acquire a vehicle speed; and change a movement speed or a display range of an optical flow to be presented to a driver, in a case where the vehicle speed falls outside a predetermined range.

DETAILED DESCRIPTION

Hereinafter, preferred examples of the present invention will be described in detail with reference to the appended drawings. Note that the following description is directed to illustrative examples of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following examples which are not recited in a most-generic independent claim of the present invention are optional and may be provided on an as-needed basis. The drawings are schematic and are not intended to be drawn to scale. In this specification and the appended drawings, structural elements that have substantially the same function and structure are denoted with the same reference numerals, and repeated description of these structural elements is omitted.

The technology described in JP-A No. 2016-572 changes a display state of light spots projected on a front windshield between in the case of performing acceleration assist and in the case of performing deceleration assist. However, the technique described in JP-A No. 2016-572 has a problem in that display of light spots bother a driver and hinder driving by the driver, because light spots are displayed along a lane on which the vehicle travels.

It is desirable to provide a novel and improved drive assist device and drive assist method that are capable of optimally controlling an optical flow to be presented to a driver.

Figure 1:
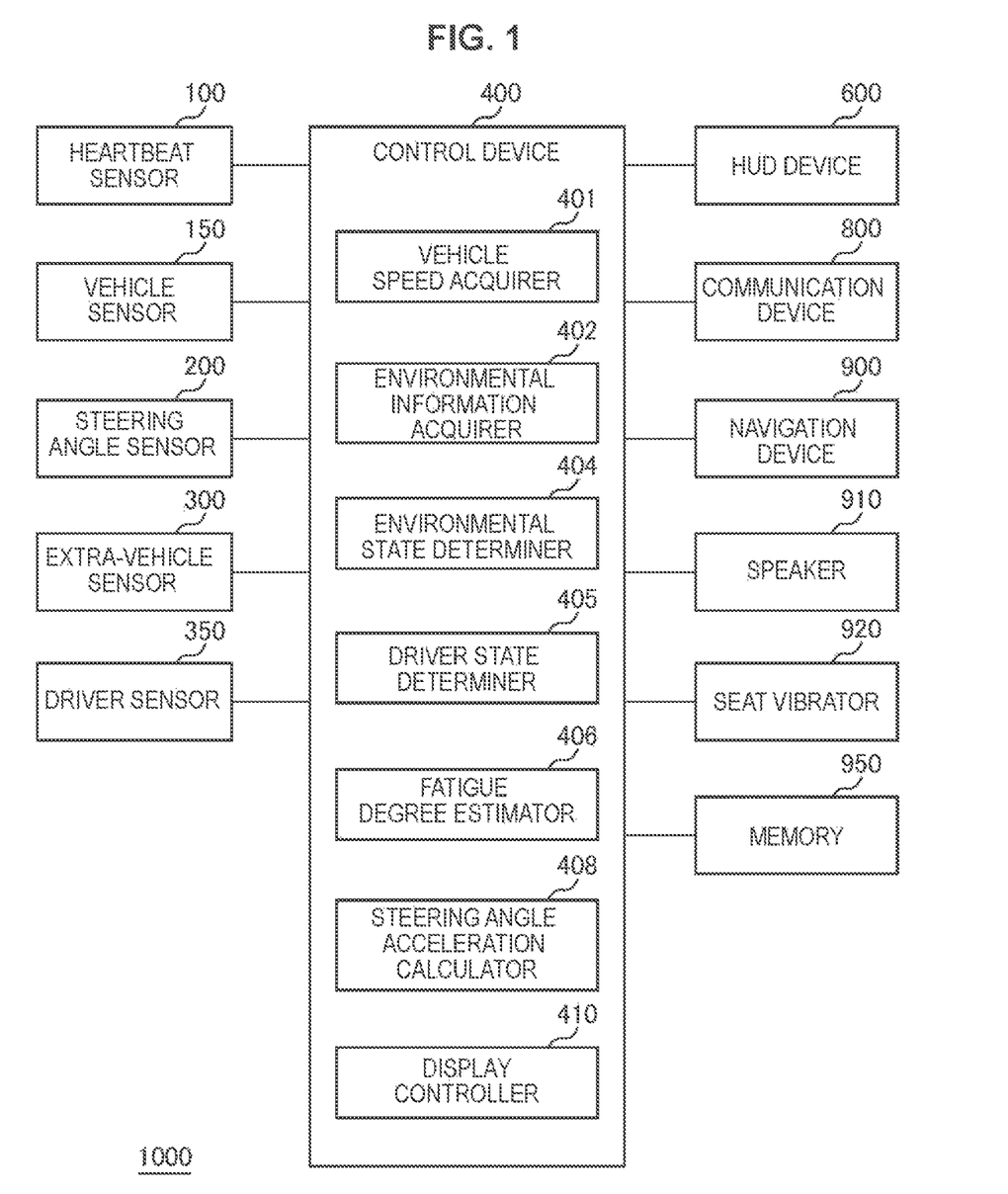
FIG. 1 is a schematic diagram illustrating a configuration of a drive assist system according to an example of the present invention.

FIG. 1 is a schematic diagram illustrating a configuration of a drive assist system 1000 according to an example of the present invention. The drive assist system 1000 is a system basically configured in a vehicle, such as an automobile. As illustrated in FIG. 1, the drive assist system 1000 includes a heartbeat sensor 100, a vehicle sensor 150, a steering angle sensor 200, an extra-vehicle sensor 300, a driver sensor 350, a control device 400, a HUD device 600, a communication device 800, a navigation device 900, a speaker 910, a seat vibrator 920, and a memory 950.

The heartbeat sensor 100 is provided, for instance, in a steering wheel operated by a driver, a seat on which the driver sits, or the like, and detects the driver's heartbeat. The driver's heartbeat detected by the heartbeat sensor 100 is sent to the control device 400. The heartbeat sensor 100 may be a wearable device such as a watch device. In this case, the heartbeat sensor 100 wirelessly transmits the detected heartbeat to the control device 400.

The vehicle sensor 150 includes various sensors that detect vehicle information, such as a vehicle speed V, an acceleration of the vehicle, and an angular velocity of an axle (e.g., a drive shaft). Note that such vehicle information is generally communicated via a controller area network (CAN) in the vehicle; hence, the vehicle sensor 150 may acquire the vehicle information from the CAN. The steering angle sensor 200 detects operation of a steering wheel by a driver.

The extra-vehicle sensor 300 includes a stereo camera, a monocular camera, a millimeter-wave radar, an infrared sensor, or the like, and measures a position or a speed of a person, a vehicle, or the like around the vehicle. In the case where the extra-vehicle sensor 300 includes a stereo camera, the stereo camera includes a pair of left and right cameras including an image sensor such as a CCD sensor or a CMOS sensor, images external environment outside the vehicle, and sends captured image information to the control device 400. For instance, the stereo camera includes a color camera capable of acquiring color information, and is installed on an upper part of a front windshield of the vehicle.

The driver sensor 350 includes a camera, a line-of-sight sensor, a motion sensor, or the like, and detects the driver's face. In addition, the driver sensor 350 measures motion of the driver's head or arm, a line-of-sight direction, or the like. In the case where the driver sensor 350 includes a camera, an image captured by the camera is subjected to image processing; thus, the driver's face, motion of the driver's head or arm, a line-of-sight direction, or the like is acquired. In addition, in the case where the driver sensor 350 includes a line-of-sight sensor, line-of-sight detection is performed by a method such as corneal reflex.

The control device 400 is a structural element that controls the entire drive assist system 1000, and functions as a drive assist device according to the present example.

The head-up display (HUD) device 600 is a display device that displays information directly in a human visual field, and displays a real image or a virtual image on glass, such as a front windshield or a rear windshield of an automobile. As the HUD device 600, more specifically, a device using a self-luminous intermediate film can be used, for instance. In this case, the self-luminous intermediate film is disposed in the front windshield of the vehicle to be sandwiched by two front and back sheets of glass. The self-luminous intermediate film includes a light emitting material, and when laser light is applied from a projector installed in the vehicle, an irradiated portion emits light, and a character or an image is displayed. What is displayed is viewable from all angles, and can be visually recognized even from seats other than a driver seat and from the outside of the vehicle. Note that the HUD device 600 can also be configured by disposing a self-luminous device on a windshield of the vehicle. In this case, for instance, a transparent screen using an organic EL element, a transmissive liquid crystal device, or the like can be used. In addition, a device other than the HUD device 600 may be used; for instance, a large liquid crystal device, an LED display device, or the like installed in an instrument panel may be used instead of the HUD device 600. In addition, a wearable device such as a head mounted display (HMD) may be used instead of the HUD device 600.

The communication device 800 communicates with the outside of the vehicle, and receives various types of information, such as traffic jam information and road information. The navigation device 900 searches for a route from a current location to a destination on the basis of map information. For this, the navigation device 900 can acquire a current position of the vehicle by the global positioning system (GPS) or the like. In addition, the navigation device 900 stores a route that the vehicle has traveled up to the current location. The speaker 910 generates alert sound when the HUD device 600 displays an alert to the driver. The seat vibrator 920 is provided in a seat of the vehicle, and alerts the driver and a passenger by vibrating the seat when the HUD device 600 displays an alert to the inside of the vehicle. The memory 950 stores various types of information to be used when the control device 400 performs control. The memory 950 stores, in advance, a speed (a speed in a radiation direction from a point where the optical flow 610 occurs) of an optical flow 610 (points and lines) when the vehicle speed V is adequate, and information (default value) of a size of a non-display range 620.

Figure 2:
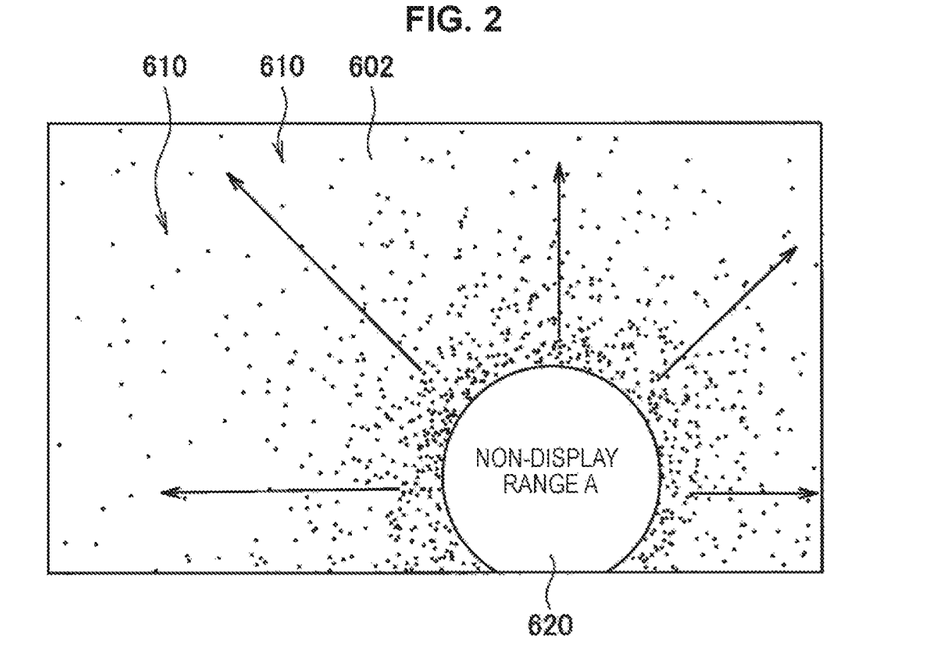
FIG. 2 is a schematic diagram illustrating a state where an optical flow is displayed on a front windshield.
Figure 3:
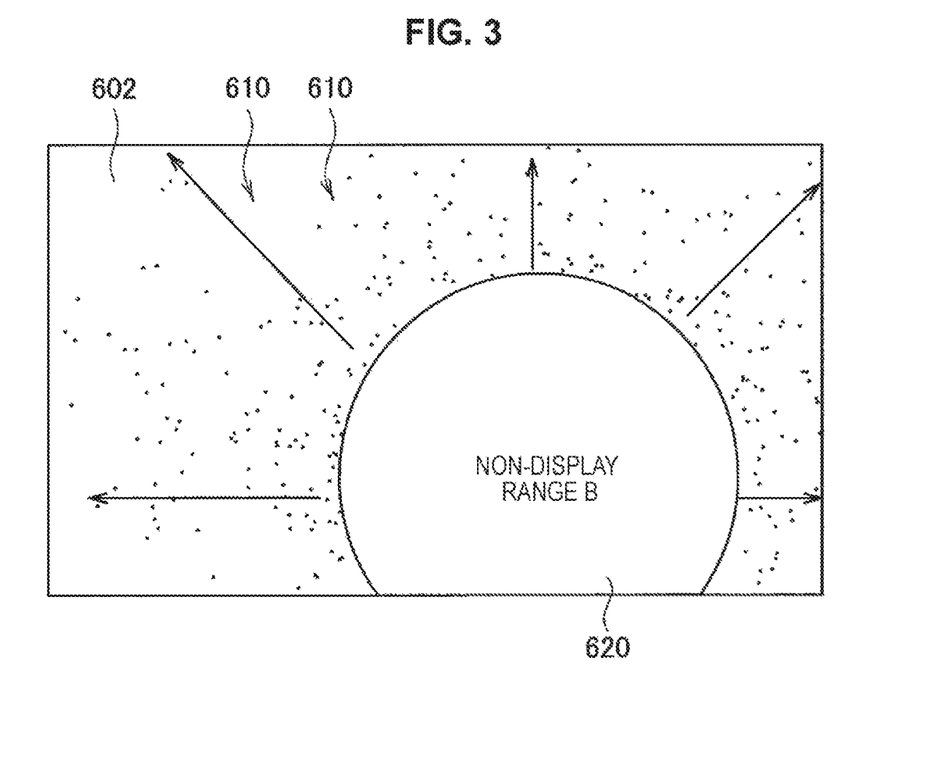
FIG. 3 is a schematic diagram illustrating a state where an optical flow is displayed on a front windshield.

In the present example, the HUD device 600 displays (projects) the optical flow 610 on the front windshield of the vehicle. The optical flow 610 is visually recognized as moving from the far side to the near side in the case where the driver faces frontward. Therefore, the driver can feel that the vehicle is traveling at a speed corresponding to motion of the optical flow by visually recognizing the optical flow. FIGS. 2 and 3 are schematic diagrams each illustrating a state where the optical flow 610 is displayed on a front windshield 602. The optical flow 610 is displayed on the front windshield 602 so as to move in a direction indicated by an arrow in FIG. 2. In other words, the optical flow 610 is displayed so as to move radially outward from any point located in front of the driver on the front windshield 602. In the present example, a speed at which the optical flow 610 moves is changed in accordance with a vehicle speed, a situation around the vehicle, a fatigue degree of the driver, or the like. As described above, the driver feels that the vehicle is traveling at a speed corresponding to motion of the optical flow; hence, by changing the speed at which the optical flow 610 moves, the driver can be guided so as to make the vehicle speed appropriate.

Motion of a plurality of feature points can be detected for each frame by a method such as block matching on the basis of image information of external environment imaged by the extra-vehicle sensor 300, and the optical flow 610 can be displayed by the motion of these feature points. Consequently, the higher the vehicle speed V is, the faster the motion of the optical flow 610 on the front windshield 602 is.

In addition, motion of the optical flow 610 may be stored in advance as a predetermined pattern. In this case, each pattern in which the optical flow 610 moves is stored in a memory or the like in association with the vehicle speed V. In displaying the optical flow 610, a motion pattern of the optical flow 610 corresponding to the current vehicle speed V is extracted from the memory 950, and the optical flow 610 is displayed on the front windshield 602 in accordance with the extracted pattern.

On the front windshield 602, speeds of the points of the optical flow 610 are basically equal speed, but the optical flow 610 that passes near the center of the front windshield 602 appears to be faster than the optical flow 610 that passes near an end. In other words, a speed of the optical flow 610 can be changed in accordance with a display position on the front windshield 602. In addition, a speed of the optical flow 610 may be temporally changed.

In the present example, a speed at which the optical flow 610 moves is changed in accordance with the vehicle speed V. In the case where the vehicle speed V is excessively high, the optical flow 610 is moved so as to be faster than motion of the optical flow 610 corresponding to the actual vehicle speed V. Thus, the driver recognizes that the vehicle speed V is fast, and performs operation such as relieving a degree of opening of an accelerator. In the case where the vehicle speed V is excessively slow, the optical flow 610 is moved so as to be slower than motion of the optical flow 610 corresponding to the actual vehicle speed V. Thus, the driver recognizes that the vehicle speed V is slow, and performs operation such as further opening the accelerator. Consequently, the vehicle speed V can be guided to an appropriate speed by changing a speed at which the optical flow 610 moves.

Specifically, as a speed of the optical flow 610, a speed that feels faster than the vehicle speed V is denoted by Vu, a speed that feels slower than the vehicle speed V is denoted by Vd, and an initial speed is set to a speed Vc that feels equal to the vehicle speed V. Then, the vehicle speed V can be guided to an appropriate speed by changing the speed of the optical flow 610 from Vc to Vu, or from Vc to Vd. Vu can be decided from the following formula (1), for instance.

$$Vu = Vc + u \quad (1)$$

In the formula (1), u is decided in accordance with a surrounding situation. For instance, in the case where a distance from a preceding vehicle is getting shorter, a value of u is decided from the following formula (2).

$$u = |V - V\mathrm{max}| \times Au \quad (2)$$

In the formula (2), Au is decided from a relative speed with respect to the preceding vehicle. For instance, Au is decided as follows. Au=2 in the case where relative speed>10 km/h, and Au=1 in the case where relative speed≤10 km/h.

In addition, Vd can be decided from the following formula (3), for instance.

$$Vd = Vc - d \quad (3)$$

In the formula (3), d is decided in accordance with a surrounding situation. For instance, in the case where the vehicle speed V is reduced by going uphill, a value of d is decided from the following formula (4).

$$d = |V - V\mathrm{min}| \times Ad \quad (4)$$

In the formula (4), Ad is decided from a value of |V−Vmin|. For instance, Ad is decided as follows.
Ad=2 in the case where |V−Vmin|>10 km/h
Ad=1 in the case where |V−Vmin|≤10 km/h In addition, in FIGS. 2 and 3, the non-display range 620 in which the optical flow 610 is not displayed in the case where the optical flow 610 is displayed on the front windshield 602 of the vehicle is set. The optical flow 610 is displayed only around the non-display range 620. This can reduce inconvenience caused by the optical flow 610 getting within sight when the driver visually recognizes a road in the front on which the vehicle travels.

Figure 4:
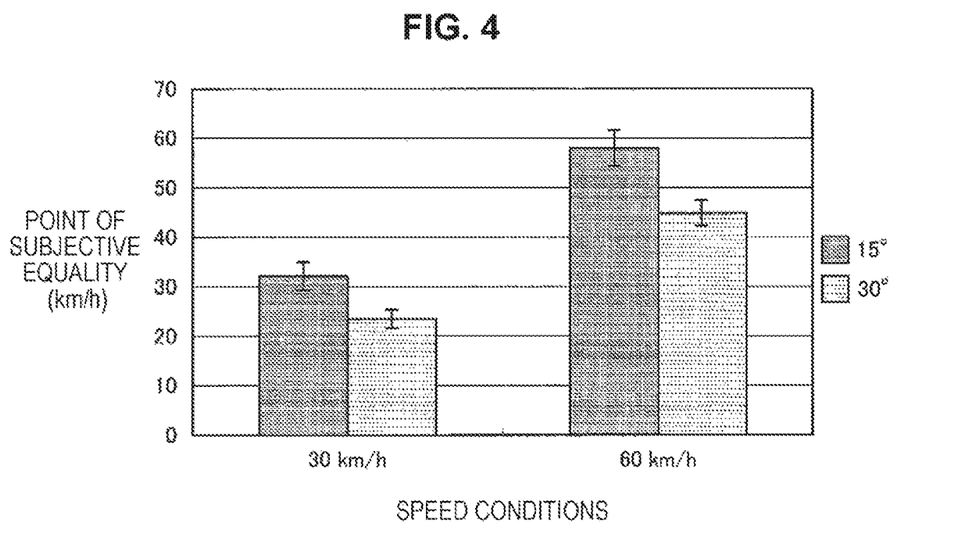
FIG. 4 is a characteristic diagram illustrating a result of performing an experiment for researching speed perception of an optical flow.

In the present example, the driver is guided so as to make the vehicle speed V appropriate by increasing or decreasing a speed of the optical flow 610 from the speed of the optical flow 610 corresponding to the actual vehicle speed V (the speed Vc that feels equal to the vehicle speed V). On the other hand, even when the speed of the optical flow 610 is the speed Vc that feels equal to the vehicle speed V, a speed of the vehicle that the driver feels differs depending on a size of the non-display range 620 of the optical flow 610. FIG. 4 is a characteristic diagram illustrating a result of performing an experiment for researching speed perception of the optical flow 610. In this experiment, the optical flows 610 with the non-display ranges 620 of 15° and 30° were displayed to be superimposed on scenery video at vehicle speeds of 30 (km/h) and 60 (km/h). Then, a speed (speed Vc) of the optical flow 610 that feels the same as the speed of the scenery video was evaluated. Note that parameter estimation by sequential testing (PEST) devised by improving an up-and-down method in perceptual psychology experiments was used for the evaluation.

In FIG. 4, the vertical axis indicates a point of subjective equality (km/h). The point of subjective equality indicates the speed (speed Vc) of the optical flow 610 that feels the same as the speed of the scenery video. In other words, the slower the point of subjective equality is, the faster an experiment participant feels the optical flow 610. In addition, a series of bar graphs indicates a factor of the non-display ranges 620 with different sizes (15°, 30°) of the optical flows 610, and the horizontal axis indicates a factor of speed conditions. Here, the non-display range 620 is indicated by a viewing angle, and the non-display range 620 is larger in the case where the viewing angle is 30° than in the case where the viewing angle is 15°. As illustrated in FIG. 4, the following result was obtained: the larger the non-display range 620 is, the faster the optical flow 610 feels. For instance, in the case where motion of the optical flow 610 is caused to correspond to the vehicle speed V of 30 km/h, the point of subjective equality is slower in the case where the viewing angle is 30° than in the case where the viewing angle is 15°. This indicates that a viewing angle of 30° causes the optical flow 610 to feel faster than a viewing angle of 15°.

Consequently, the speed of the optical flow 610 that the driver feels can be changed by changing the size of the non-display range 620. The non-display range 620 illustrated in FIG. 3 has a larger size than the non-display range 620 illustrated in FIG. 2. Even in the case where the speed of the optical flow 610 is not changed, making the non-display range 620 larger causes the driver to feel the optical flow 610 as moving faster. Note that as the size (area) of the non-display range 620, a minimum range illustrated in FIG. 2 is denoted by A, a maximum range illustrated in FIG. 3 is denoted by B, and an initial range is set to (A+B)/2. Therefore, in the present example, the size of the non-display range 620 is changed in accordance with a driving situation of the vehicle or a situation of the driver.

As described above, the speed of the optical flow 610 that the driver feels can be changed by changing the size of the non-display range 620, and front viewability for the driver can be changed by changing the size of the non-display range 620. In regard to viewability for the driver, it is more desirable to secure viewability and facilitate driving when an environmental state around the vehicle is a state where driving is more difficult or the driver's fatigue degree is higher.

According to the above viewpoints, in the present example, guiding is performed to make the vehicle speed appropriate by changing a speed at which the optical flow 610 moves in accordance with a vehicle speed, a situation around the vehicle, or the driver's fatigue degree, and changing the size of the non-display range 620 of the optical flow 610. Therefore, the control device 400 includes a vehicle speed acquirer 401 that acquires the vehicle speed V from the vehicle sensor 150, an environmental information acquirer 402 that acquires environmental information around the vehicle, an environmental state determiner 404 that determines an environmental state around the vehicle on the basis of environmental information, a driver state determiner 405 that determines a state of the driver, a fatigue degree estimator 406 that estimates a fatigue degree of the driver, a steering angle acceleration calculator 408 that calculates steering angle acceleration from a detection value of the steering angle sensor 200, and a display controller 410 that controls display by the HUD device 600. Note that structural elements of the control device 400 illustrated in FIG. 1 can include a circuit (hardware), or a central processor such as a CPU and a program (software) for making it function.

The environmental information acquirer 402 can, in regard to a pair of left and right stereo images captured by the pair of left and right cameras of the stereo camera included in the extra-vehicle sensor 300, generate and acquire distance information to a target by the principle of triangulation from a gap between corresponding positions. At the same time, the environmental information acquirer 402 can acquire position information of a subject from image information. In addition, the environmental information acquirer 402 performs well-known grouping processing on distance information generated by the principle of triangulation, and compares the distance information subjected to grouping processing with three-dimensional three-dimensional-object data or the like set in advance, thereby detecting three-dimensional-object data, lane line data, or the like. Thus, the control device 400 can also recognize a person, another vehicle, a speed sign, a stop sign, a stop line, an ETC gate, or the like.

In addition, the environmental information acquirer 402 can calculate an amount of change in distance from a person or another vehicle and a relative speed by using distance information from a person or another vehicle generated by the principle of triangulation. The amount of change in distance can be obtained by adding up a distance between frame images detected for each unit time. In addition, the relative speed can be obtained by dividing the distance detected for each unit time by the unit time.

Thus, the environmental information acquirer 402 acquires image information of the outside of the vehicle obtained from the extra-vehicle sensor 300, performs image analysis processing, and acquires environmental information outside the vehicle from an analysis result of the image information.

The environmental state determiner 404 determines an environmental state outside the vehicle on the basis of environmental information acquired by the environmental information acquirer 402. In particular, the environmental state determiner 404 determines whether an obstacle such as a person, a vehicle, or another object exists around the vehicle, the number of obstacles such as a person, a vehicle, or another object existing around the vehicle, a road width around the vehicle, or the like.

The fatigue degree estimator 406 estimates a fatigue degree of the driver on the basis of information detected by the heartbeat sensor 100, the extra-vehicle sensor 300, or the driver sensor 350. In addition, the fatigue degree estimator 406 estimates the driver's fatigue degree on the basis of information or the like received from the outside by the communication device 800. In addition, on the basis of the driver's driving duration, the fatigue degree estimator 406 estimates the fatigue degree to be higher as the driving duration is longer. A method for the fatigue degree estimator 406 to estimate the driver's fatigue degree is described below.

In the case of estimating the driver's fatigue degree on the basis of information detected by the heartbeat sensor 100, a fatigue degree is estimated from a ratio (LF/HF) between a high-frequency component (HF) and a low-frequency component (LF) of time-series data of heartbeat fluctuation. Specifically, it is known that depending on balance of a tension state between sympathetic nerves and parasympathetic nerves, sizes in which a wave of the high-frequency component (HF) and a wave of the low-frequency component (LF) appear in heartbeat fluctuation change. Consequently, by using this, balance of autonomic nerves can be estimated from heartbeat fluctuation. Note that the high-frequency component (HF) corresponds to a sympathetic nerve component, and the low-frequency component (LF) corresponds to a parasympathetic nerve component. The fatigue degree can be obtained from degrees or balance of tension of sympathetic nerves and parasympathetic nerves; the driver can be estimated to be in a "stress state" and tired if the sympathetic nerves are in a tension state, and conversely, the driver can be estimated to be in a "relax state" if the parasympathetic nerves are in a tension state. In other words, the ratio (LF/HF) between the high-frequency component (HF) and the low-frequency component (LF) decreases as the fatigue degree increases.

Consequently, the fatigue degree estimator 406 can estimate the driver's fatigue degree on the basis of the ratio (LF/HF) between the high-frequency component (HF) and the low-frequency component (LF) of time-series data of heartbeat fluctuation.

In the case of estimating the driver's fatigue degree on the basis of information detected by the extra-vehicle sensor 300, the fatigue degree estimator 406 acquires the number of obstacles such as a person, a vehicle, or another object around the vehicle determined by the environmental state determiner 404. The larger the number of obstacles existing around the vehicle is, the more the driver pays attention to obstacles during driving. Consequently, the fatigue degree estimator 406 estimates the driver's fatigue degree to be higher as the number of obstacles is larger.

Figure 5:
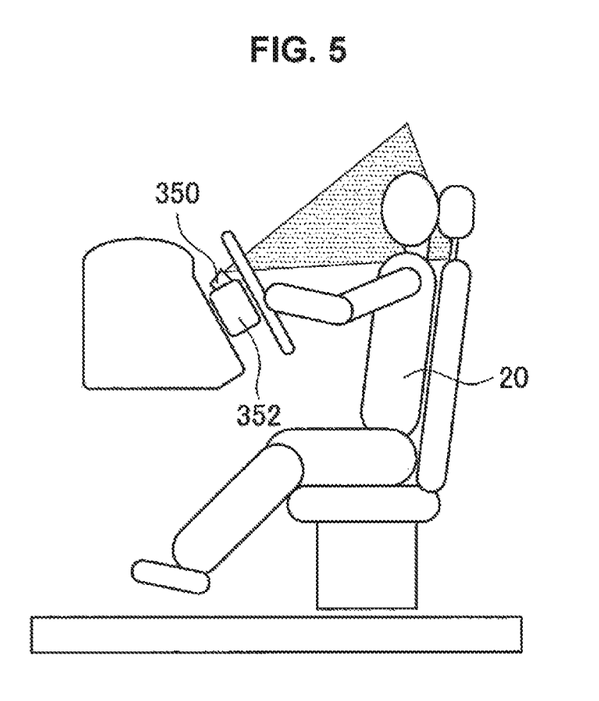
FIG. 5 is a schematic diagram illustrating a state where a driver sensor is imaging a driver in the case where the driver sensor includes a camera.

FIG. 5 is a schematic diagram illustrating a state where the driver sensor 350 is imaging a driver 20 in the case where the driver's fatigue degree is estimated on the basis of information detected by the driver sensor 350, and the driver sensor 350 includes a camera. As illustrated in FIG. 5, the driver sensor 350 is installed on top of a steering column 352, for instance.

In the case where the driver sensor 350 includes a camera, an image captured by the driver sensor 350 is input to the control device 400. The driver state determiner 405 detects position information of feature points of parts of a face, such as an eye, a nose, and a mouth from an input image, and determines a state of the driver, such as possibility of not keeping one's eyes on the road, such as being sleepy or dozing, on the basis of position information.

Figure 6:
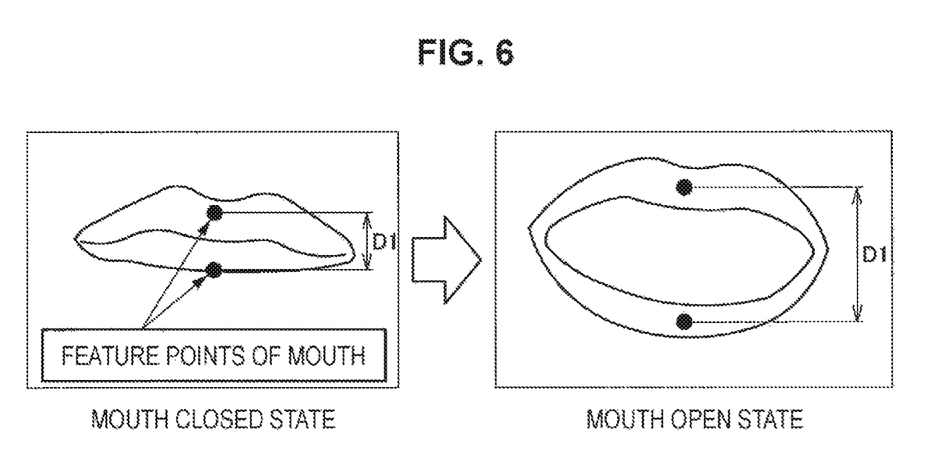
FIG. 6 is a schematic diagram illustrating open mouth detection of determining whether a driver's mouth is open.

FIG. 6 is a schematic diagram illustrating open mouth detection of determining whether the driver's mouth is open. As illustrated in FIG. 6, an open/closed state of the mouth is determined from a distance D1 between upper and lower feature points of the mouth, and in the case where the distance D1 between the feature points exceeds a predetermined value (a mouth open state illustrated in FIG. 6), it can be determined that there is a possibility that the driver's mouth is open and the driver may be yawning. In addition, in the case where a situation in which a certain period of time passes in a mouth open state is detected a plurality of times, for instance, it can be judged that the danger of dozing has increased.

Figure 7:
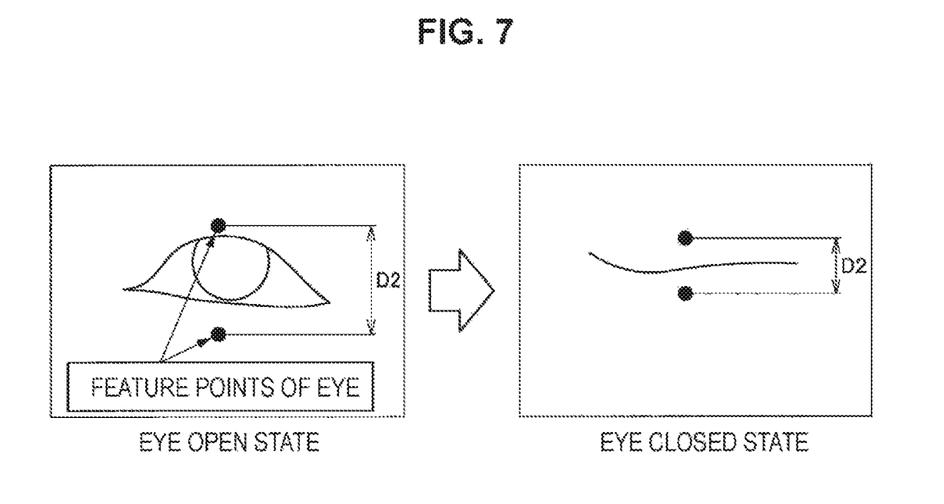
FIG. 7 is a schematic diagram illustrating how it is determined whether a driver's eye is closed.

FIG. 7 is a schematic diagram illustrating how it is determined whether the driver's eye is closed. As illustrated in FIG. 7, it is detected that the eye is closed from a distance D2 between upper and lower feature points of the eye, and in the case where the distance D2 between the feature points is equal to or less than a predetermined value (an eye closed state illustrated in FIG. 7), it can be determined that there is a possibility that the driver is dozing. Determination of whether the driver is dosing can be made depending on, for instance, whether a ratio of time during which the eye is closed with respect to reference time (closed eye ratio) exceeds a predetermined threshold. In addition, when closed eye is detected a plurality of times, it can be judged that the danger of dozing has increased. In addition, blinking may be detected by image processing, and it may be determined whether the driver is dosing on the basis of the number of times of blinking. These determinations related to FIGS. 6 and 7 are performed by the driver state determiner 405. The fatigue degree estimator 406 estimates the driver's fatigue degree on the basis of a determination result by the driver state determiner 405.

In the case of estimating the driver's fatigue degree on the basis of information detected by the driver sensor 350, the fatigue degree can be determined on the basis of facial expression. In this case, the driver state determiner 405 determines the driver's facial expression. A facial image whose fatigue state is defined in advance and a current facial image are compared, and the fatigue degree is estimated on the basis of a result of the comparison. A plurality of facial images of a person for which multiple levels of fatigue degrees are defined by subjective evaluation is learned as teacher data, and the fatigue degree is determined by inputting a current facial image of the driver for comparison.

Figure 8:
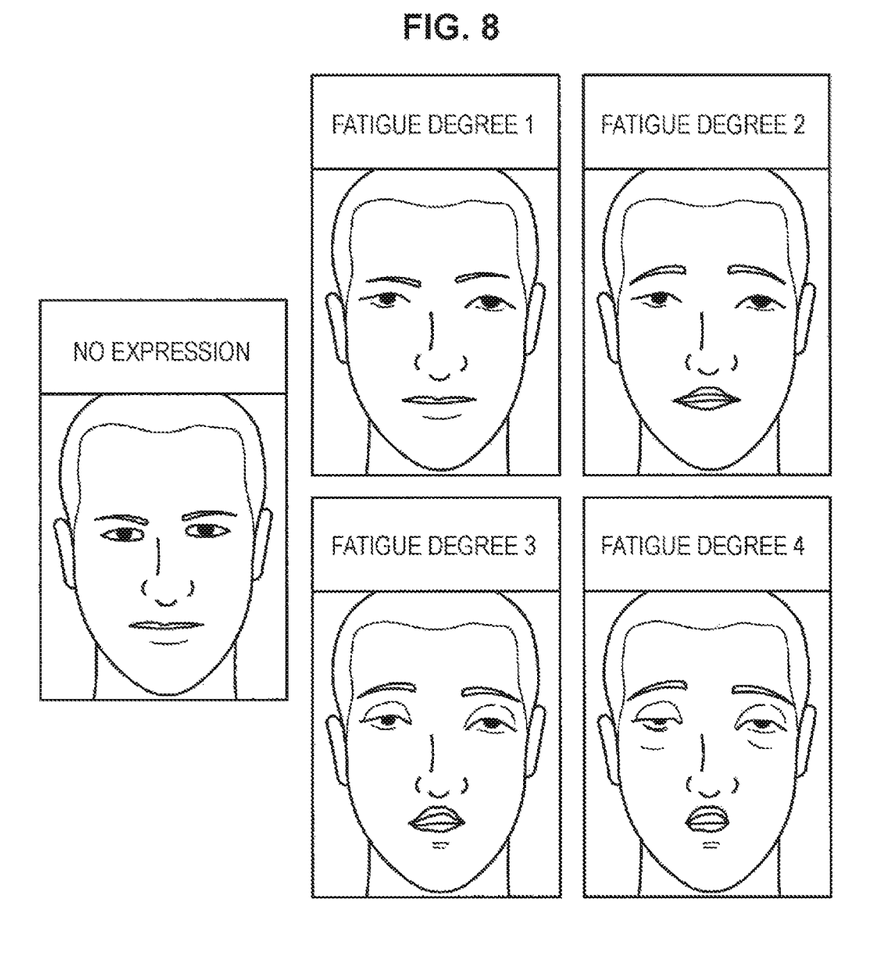
FIG. 8 is a schematic diagram illustrating a technique for a driver state determiner to determine a driver's facial expression.

FIG. 8 is a schematic diagram illustrating a technique for the fatigue degree estimator 406 to estimate a fatigue degree on the basis of a facial image whose fatigue state is defined in advance. As illustrated in FIG. 8, image information of facial expressions and fatigue degrees (fatigue degrees 1 to 4) corresponding to the respective pieces of image information are associated and held in the memory 950 in advance. The driver state determiner 405 compares, by a method such as block matching, image information of the driver's face acquired from the driver sensor 350 with image information illustrated in FIG. 8 held in advance, extracts one highly similar to the image information of the driver from the image information illustrated in FIG. 8, and determines the driver's fatigue degree on the basis of the fatigue degree corresponding to the extracted image information.

In addition, in the case of estimating the driver's fatigue degree on the basis of information received from the outside by the communication device 800, the fatigue degree estimator 406 estimates the driver's fatigue degree on the basis of the amount of traffic or traffic jam information around the vehicle received by the communication device 800. For instance, the driver's fatigue degree can be estimated to be higher as the amount of traffic around the vehicle is larger. In addition, in the case where a traffic jam has occurred in a road around the vehicle, the driver's fatigue degree can be estimated in accordance with a degree of the traffic jam. In this case, the driver's fatigue degree can be estimated to be higher as a distance of the traffic jam is longer.

In addition, the fatigue degree estimator 406 estimates the driver's fatigue degree on the basis of road information or the like around the vehicle received by the communication device 800. For instance, in the case where a road is narrow or there are consecutive curves on the basis of road information around the vehicle, the driver's fatigue degree can be estimated to be high.

The fatigue degree estimator 406 can also estimate the driver's fatigue degree on the basis of road information of a route that has been traveled up to a current position or road information of a route to be traveled for a destination, on the basis of information obtained from the navigation device 900. For instance, the driver's fatigue degree can be estimated to be higher as the proportion of a curve section in a predetermined section is higher in a route that has been traveled up to a current position or a route to be traveled toward a destination.

In addition, the fatigue degree estimator 406 can acquire steering angle acceleration calculated by the steering angle acceleration calculator 408, and estimate the driver's fatigue degree on the basis of the number of times steering angle acceleration exceeds a predetermined threshold within a certain period of time. The larger the number of times the steering angle acceleration exceeds the predetermined threshold is, the higher a degree to which rapid steering operation is performed is. In other words, smoothness of steering can be determined on the basis of the number of times steering angle acceleration exceeds a predetermined threshold within a certain period of time, and the driver's fatigue degree can be estimated on the basis of this.

The display controller 410 controls display by the HUD device 600, and particularly controls a display state of the optical flow 610. The display controller 410 performs control for changing the speed or the non-display range 620 of the optical flow 610. More specifically, the display controller 410 performs control in a manner that the speed of the optical flow 610 becomes the speed Vc that feels equal to the vehicle speed V, the speed Vu that feels faster than the vehicle speed V, or the speed Vd that feels slower than the vehicle speed V. Note that the speed of the optical flow 610 is changed by changing a movement speed of the optical flow 610 on the front windshield 602. In addition, the display controller 410 performs control of matching a point where the optical flow 610 occurs (a center point of the non-display range 620) with a line-of-sight position or a position of the driver's eye detected by the driver sensor 350.

Figure 9:
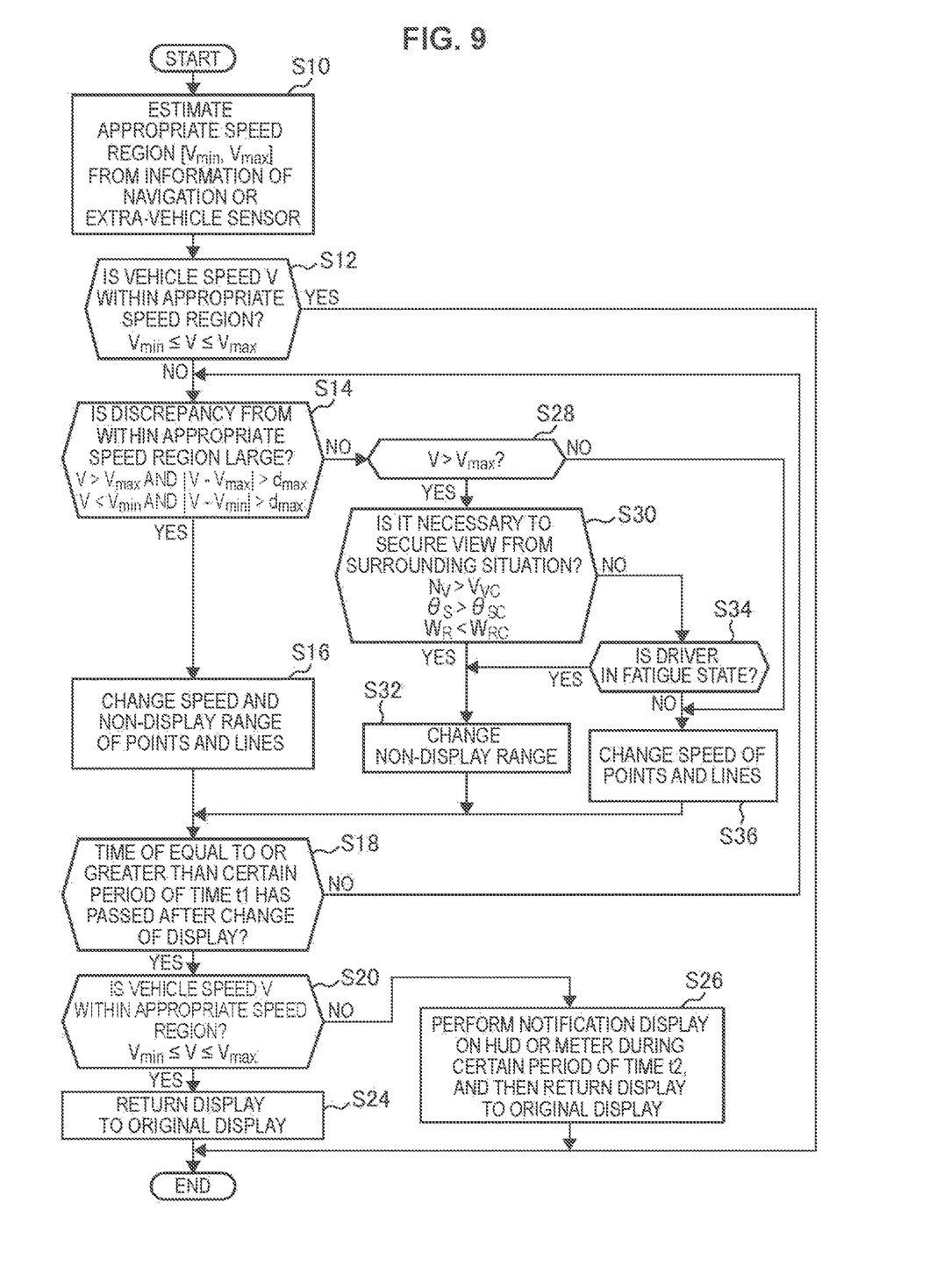
FIG. 9 is a flowchart illustrating processing performed in the drive assist system of the present example.

Next, processing performed in the drive assist system 1000 of the present example is described. FIG. 9 is a flowchart illustrating processing performed in the drive assist system 1000 of the present example. The processing in FIG. 9 is performed for each predetermined cycle mainly in the control device 400.

First, in step S10, an appropriate speed region [Vmin, Vmax] of the vehicle is estimated on the basis of information obtained from the extra-vehicle sensor 300, the navigation device 900, or the like. As described above, the environmental information acquirer 402 can recognize a speed sign on the basis of image information obtained from the extra-vehicle sensor 300; thus, the appropriate speed region of the vehicle can be estimated on the basis of the speed sign. In addition, in map information that the navigation device 900 has, positions on a map and speed limits are stored in association. Consequently, the appropriate speed region of the vehicle can be estimated on the basis of a speed limit corresponding to the current position of the vehicle.

In next step S12, it is determined whether the current vehicle speed V is within the appropriate speed region. Specifically, in step S12, it is determined whether the vehicle speed V is equal to or greater than a predetermined threshold Vmin and equal to or less than a predetermined threshold Vmax. In other words, in step S12, it is determined whether Vmin≤V≤Vmax is satisfied.

In the case where Vmin≤V≤Vmax is not satisfied in step S12, the processing goes to step S14. In step S14, it is determined whether discrepancy between the vehicle speed V and within the appropriate speed region is large. Specifically, in step S14, it is determined whether V>Vmax and |V−Vmax|>dmax are satisfied, or whether V<Vmin and |V−Vmin|>dmax are satisfied. In the case where the condition of V>Vmax and |V−Vmax|>dmax holds or the condition of V<Vmin and |V−Vmin|>dmax holds in step S14, the processing goes to step S16.

In step S16, the speed and the non-display range 620 of the optical flow 610 are changed. Specifically, in the case where the condition of V>Vmax and |V−Vmax|>dmax holds, the vehicle speed V is excessively higher than the appropriate speed region; thus, the speed of the optical flow 610 is made faster, and the non-display range 620 is made larger. For instance, the speed of the optical flow 610 is set to Vu described above, and the non-display range 620 is set to the maximum range B illustrated in FIG. 3. Thus, a speed that the driver feels becomes higher, and the driver can be guided so as to reduce the vehicle speed V. In the case where the condition of V<Vmin and |V−Vmin|>dmax holds, the vehicle speed V is excessively lower than the appropriate speed region; thus, the speed of the optical flow 610 is made slower, and the non-display range 620 is made smaller. For instance, the speed of the optical flow 610 is set to Vd described above, and the non-display range 620 is set to the minimum range A illustrated in FIG. 2. Thus, a speed that the driver feels becomes lower, and the driver can be guided so as to increase the vehicle speed V. Note that it is also possible to refrain from displaying the optical flow 610 in normal time, and display the optical flow 610 only in the case where discrepancy between the vehicle speed V and within the appropriate speed region is determined to be large in step S14.

In the case where discrepancy from within the appropriate speed region is not large in step S14, the processing goes to step S28. Specifically, in the case where neither the condition of V>Vmax and |V−Vmax|>dmax nor the condition of V<Vmin and |V−Vmin|>dmax holds in step S14, the processing goes to step S28.

In step S28, it is determined whether V>Vmax is satisfied, and in the case where V>Vmax is satisfied, the processing goes to step S30. In step S30, it is determined whether it is necessary to secure the driver's view on the basis of environmental information around the vehicle. Specifically, in step S30, it is determined whether the number $N_V$ of other vehicles around the vehicle is larger than a threshold $N_{VC}$ ($N_V > N_{NV}$), whether a steering wheel angle $\theta_S$ is larger than a threshold $\theta_{SC}$ ($\theta_S > \theta_{SC}$), and whether a road width $W_R$ around the vehicle is smaller than a threshold $W_{RC}$ ($W_R < W_{RC}$). Note that the number $N_V$ of other vehicles around the vehicle and the road width $W_R$ around the vehicle are determined by the environmental state determiner 404 on the basis of environmental information acquired by the environmental information acquirer 402. The steering wheel angle $\theta_S$ can be obtained from a detection value of the steering angle sensor 200. The steering wheel angle $\theta_S$ corresponds to information regarding a curvature of a road along which the vehicle turns. Note that in step S30, it may be determined that it is necessary to secure the driver's view in the case where an obstacle is detected.

In the case where any of the conditions holds in step S30, the processing goes to step S32. In the case where any of the conditions holds in step S30, an environmental state around the vehicle is relatively poor and the driver's view needs to be secured; hence, in step S32, processing of changing the non-display range 620 of the optical flow 610 is performed. Specifically, in step S32, processing of expanding the non-display range 620 of the optical flow 610 is performed. For instance, the non-display range 620 is set to the maximum range B illustrated in FIG. 3. Thus, the driver's view is secured, and the vehicle speed that the driver feels from the optical flow 610 is increased; thus, the driver can be guided so as to reduce the vehicle speed V.

In the case where none of the conditions holds in step S30, the processing goes to step S34. In step S34, it is determined whether the driver is in a fatigue state from an estimation result by the fatigue degree estimator 406, and in the case where the driver is in a fatigue state, the processing goes to step S32. In step S32, since the driver is in a fatigue state, processing of changing the non-display range 620 of the optical flow 610 is performed. Specifically, in step S32, processing of expanding the non-display range 620 of the optical flow 610 is performed. This can secure the view of the driver in a fatigue state and facilitate driving, and also, increase the vehicle speed that the driver feels from the optical flow 610; thus, the driver can be guided so as to reduce the vehicle speed V.

In the case where the driver is determined not to be in a fatigue state in step S34, the processing goes to step S36. In step S36, processing of changing the speed of the optical flow 610 is performed. Specifically, in step S36, processing of making the speed of the optical flow 610 faster is performed. For instance, the speed of the optical flow 610 is set to Vu described above. Thus, the vehicle speed that the driver feels from the optical flow 610 is increased; thus, the driver can be guided so as to reduce the vehicle speed V.

In the case where V>Vmax is not satisfied in step S28, the processing goes to step S36, and processing of changing the speed of the optical flow 610 is performed.

As described above, in the case where discrepancy between the vehicle speed V and within the appropriate speed region is large, the speed and the non-display range 620 of the optical flow 610 are both changed (step S16). Even in the case where discrepancy between the vehicle speed V and within the appropriate speed region is not large, if V>Vmax is satisfied, and the driver's view needs to be secured or the driver is in a fatigue state, only the non-display range 620 of the optical flow 610 is changed, and the speed is not changed (step S32). In the case where the driver is not in a fatigue state, only the speed of the optical flow 610 is changed, and the non-display range 620 is not changed (step S36).

After steps S16, S32, and S36, the processing goes to step S18. In next step S18, it is determined whether time of equal to or greater than a certain period of time t1 has passed after the change of display of the optical flow 610 in steps S16, S32, and S36, and in the case where time of equal to or greater than the certain period of time t1 has passed, the processing goes to step S20. Note that the certain period of time t1 can be changed in accordance with a range of the appropriate speed region or an environmental state outside the vehicle. For instance, the certain period of time t1 can be made longer as the appropriate speed region is narrower, and the certain period of time t1 can be made longer as the number of other vehicles outside the vehicle is larger. In step S20, it is determined whether the current vehicle speed V is within the appropriate speed region. Specifically, in step S20, it is determined whether the vehicle speed V satisfies Vmin≤V≤Vmax, as in step S12.

In the case where Vmin≤V≤Vmax is satisfied in step S20, the processing goes to step S24. In step S24, since the current vehicle speed V has entered the appropriate speed region as a result of changing display of the optical flow 610 in steps S16, S32, and S36, processing of returning display of the optical flow 610 to the original state is performed.

In the case where Vmin≤V≤Vmax is not satisfied in step S20, the processing goes to step S26. In step S26, notification display (alert display) is performed to the driver, because the current vehicle speed V has not entered the appropriate speed region despite the change of display of the optical flow 610 in step S16. Specifically, in step S26, notification display (alert display) is performed on the HUD device 600 or around a meter in front of the driver during a certain period of time t2, and then processing of returning display of the optical flow 610 to the original state is performed.

Figure 10:
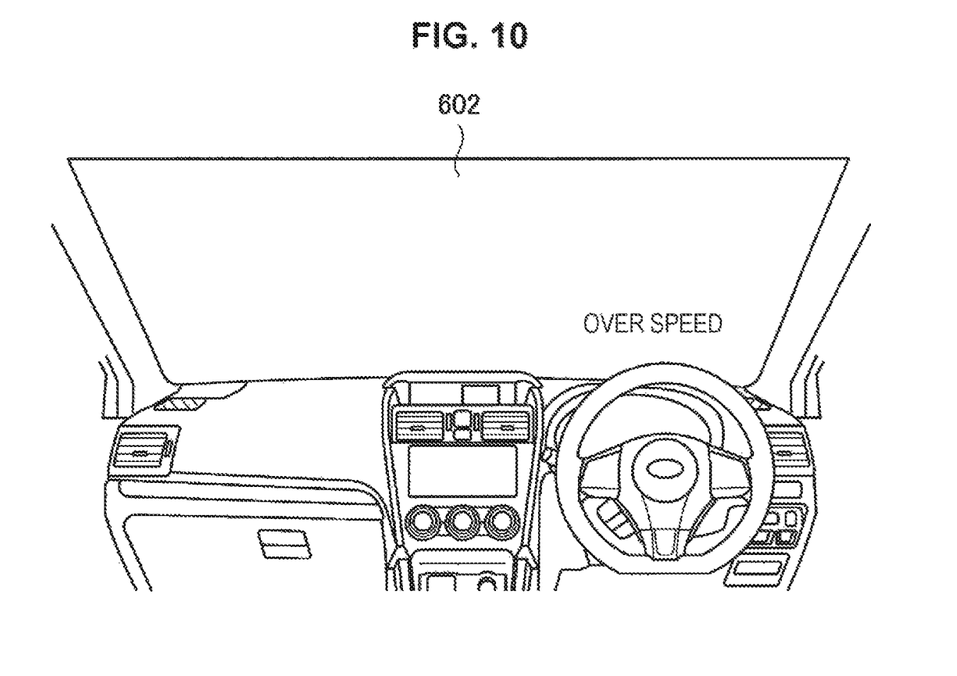
FIG. 10 is a schematic diagram illustrating an instance of notification display to a driver.
Figure 11:
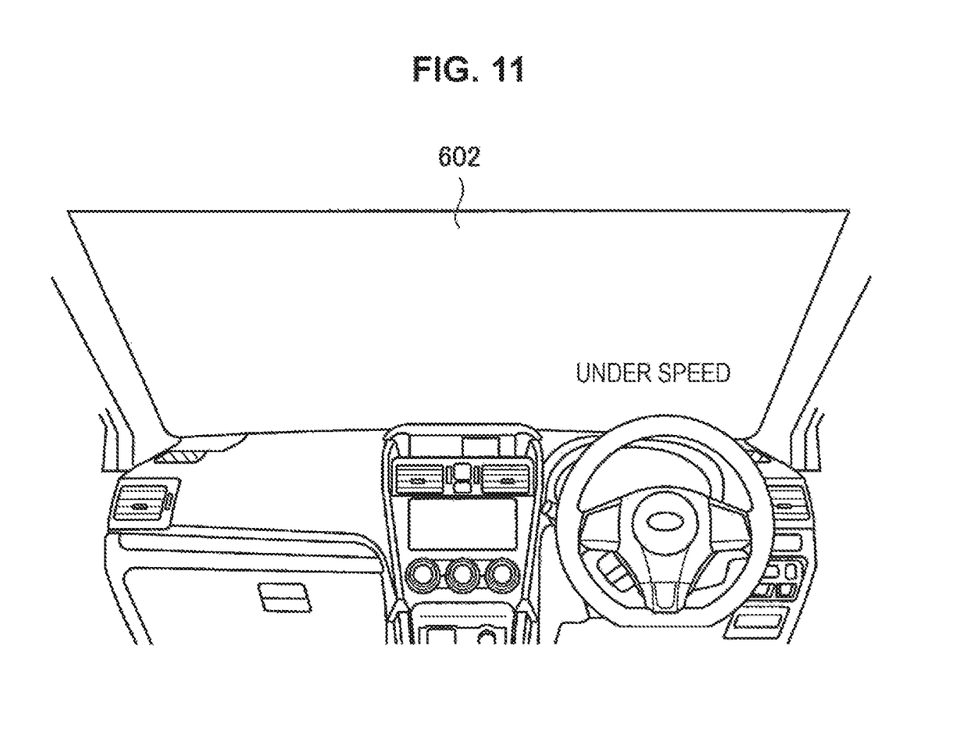
FIG. 11 is a schematic diagram illustrating an instance of notification display to a driver.

FIGS. 10 and 11 are schematic diagrams each illustrating an instance of notification display to the driver performed in step S26. FIG. 10 is a schematic diagram illustrating notification display for deceleration. In the case where the vehicle speed V exceeds an upper limit of Vmin≤V≤Vmax, the HUD device 600 displays a display "over speed" for prompting the driver to decelerate on the front windshield 602. FIG. 11 is a schematic diagram illustrating notification display for acceleration. In the case where the vehicle speed V is below a lower limit of Vmin≤V≤Vmax, the HUD device 600 displays a display "under speed" for prompting the driver to accelerate on the front windshield 602. Performing notification display to the driver enables the vehicle speed V to be reliably guided to the appropriate speed region.

As described above, according to the present example, guiding can be performed to make the vehicle speed appropriate, and the driver's view can be secured, by changing a speed at which the optical flow 610 moves in accordance with the vehicle speed V, a situation around the vehicle, or the driver's fatigue degree, and changing the size of the non-display range 620 of the optical flow 610. Consequently, the optical flow to be presented to the driver can be optimally controlled.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A drive assist device of a vehicle, comprising:
    one or more sensors associated with the vehicle;
    a fatigue degree estimator configured to estimate a fatigue degree of a driver of the vehicle based on information detected by the one or more sensors;
    an environmental information acquirer configured to acquire an environmental information around the vehicle based on information detected by the one or more sensors;
    a display controller configured to change a display range of an optical flow to be presented to the driver via a display of the vehicle, on a basis of the environmental information or the fatigue degree,
    wherein in a case where there is no need to secure a view of the driver in accordance with the environmental information and the driver is not in a fatigue state associated with the fatigue degree, the display controller makes a movement speed of the optical flow faster without changing the display range of the optical flow.

2. The drive assist device according to claim 1, wherein in a case where the driver is in the fatigue state, the display controller expands a non-display range of the optical flow.

3. The drive assist device according to claim 1, wherein the fatigue degree estimator estimates the fatigue degree based on the information detected by the one or more sensors on a basis of a heartbeat of the driver, an image information obtained by imaging the driver, a steering angle acceleration when the driver operates a steering wheel, an information of another vehicle around the vehicle, a road information of a road on which the vehicle travels, or a driving duration of the driver.

4. The drive assist device according to claim 1, wherein in the case it is necessary to secure the view of the driver in accordance with the environmental information, the display controller expands a non-display range of the optical flow in accordance with the environmental information.

5. The drive assist device according to claim 4, wherein the environmental information is the information regarding a number of other vehicles around the vehicle, the information regarding a curvature of a road along which the vehicle turns, or the information regarding a width of a road on which the vehicle travels.

6. The drive assist device according to claim 1, wherein the optical flow is displayed on a front windshield in front of the driver.

7. The drive assist device according to claim 1, wherein the optical flow comprises at least a line or a point, and is projected.

8. The drive assist device according to claim 1, further comprising
    the one or more sensors comprising a vehicle speed acquirer configured to acquire a vehicle speed,
    wherein the display controller changes the display range in a case where the vehicle speed falls outside a predetermined range.

9. The drive assist device according to claim 8, wherein in a case where the vehicle speed deviates from the predetermined range determined in advance, the display controller changes the display range of the optical flow and changes the movement speed of the optical flow, regardless of the fatigue degree.

10. The drive assist device according to claim 9, wherein in a case where the vehicle speed exceeds the predetermined range and deviates from the predetermined range, the display controller expands a non-display range of the optical flow and makes the movement speed faster.

11. The drive assist device according to claim 9, wherein in a case where the vehicle speed is below the predetermined range and deviates from the predetermined range, the display controller shrinks a non-display range of the optical flow and makes the movement speed slower.

12. The drive assist device according to claim 9, wherein in a case where the vehicle speed has entered the predetermined range determined in advance after passage of a certain period of time after change of a display state of the optical flow, the display controller returns the display state of the optical flow to a state before the change.

13. The drive assist device according to claim 9, wherein in a case where the vehicle speed does not enter the predetermined range determined in advance even when a certain period of time passes after change of a display state of the optical flow, an alert is issued.

14. A drive assist device of a vehicle comprising:
a vehicle speed acquirer configured to acquire a vehicle speed;
a fatigue degree estimator configured to estimate a fatigue degree of a driver of the vehicle based on information detected by one or more sensors associated with the vehicle;
a display controller configured to change a movement speed or a display range of an optical flow to be presented to the driver via a display of the vehicle, in a case where the vehicle speed falls outside a predetermined range; and
an environmental information acquirer configured to acquire an environmental information around the vehicle based on information detected by the one or more sensors,
wherein the display controller changes the display range of the optical flow to be presented to the driver on a basis of the environmental information or a fatigue degree, and
wherein in a case where there is no need to secure a view of the driver in accordance with the environmental information and the driver is not in a fatigue state associated with the fatigue degree, the display controller makes the movement speed of the optical flow faster without changing the display range of the optical flow.

15. A drive assist method comprising:
estimating, by a fatigue degree estimator of a vehicle, a fatigue degree of a driver of the vehicle based on information detected by one or more sensors associate with the vehicle;
acquiring, by an environmental information acquirer of the vehicle, an environmental information around the vehicle based on information detected by the one or more sensors;
changing, by a display controller of the vehicle, a display range of an optical flow to be presented to the driver via a display of the vehicle, on a basis of the environmental information or the fatigue degree,
wherein in a case where there is no need to secure a view of the driver in accordance with the environmental information and the driver is not in a fatigue state associated with the fatigue degree, making, by the display controller, a movement speed of the optical flow faster without changing the display range of the optical flow.

16. A drive assist method comprising:
acquiring, by a vehicle speed acquirer associated with a vehicle, a vehicle speed;
estimating, by a fatigue degree estimator of the vehicle, a fatigue degree of a driver of the vehicle based on information detected by one or more sensors associate with the vehicle;
changing, by a display controller of the vehicle, a movement speed or a display range of an optical flow to be presented to a driver via a display of the vehicle, in a case where the vehicle speed falls outside a predetermined range;
acquiring, by the one or more sensors, an environmental information around the vehicle,
wherein changing, by the display controller, the display range of the optical flow to be presented to the driver comprises changing the display range of the optical flow on a basis of the environmental information or the fatigue degree; and
wherein in a case where there is no need to secure a view of the driver in accordance with the environmental information and the driver is not in a fatigue state associated with the fatigue degree, making, by the display controller, the movement speed of the optical flow faster without changing the display range of the optical flow.

17. A drive assist device comprising circuitry configured to
estimate, by a fatigue degree estimator of a vehicle, a fatigue degree of a driver of the vehicle based on information detected by one or more sensors associate with the vehicle,
acquire, by an environmental information acquirer of the vehicle, an environmental information around the vehicle based on information detected by the one or more sensors; and
change, by a display controller of the vehicle, a display range of an optical flow to be presented to the driver via a display of the vehicle, on a basis of the environmental information or the fatigue degree,
wherein in a case where there is no need to secure a view of the driver in accordance with the environmental information and the driver is not in a fatigue state associated with the fatigue degree, the circuitry makes a movement speed of the optical flow faster without changing the display range of the optical flow.

18. A drive assist device comprising:
circuitry configured to
acquire, by a vehicle speed acquirer associated with a vehicle, a vehicle speed;
estimating, by a fatigue degree estimator of the vehicle, a fatigue degree of a driver of the vehicle based on information detected by one or more sensors associate with the vehicle;
change, by a display controller of the vehicle, a movement speed or a display range of an optical flow to be presented to a driver via a display of the vehicle, in a case where the vehicle speed falls outside a predetermined range; and
acquire, by the one or more sensors, an environmental information around the vehicle, wherein the circuitry changes the display range of the optical flow to be presented to the driver on a basis of the environmental information or a fatigue degree, and
wherein in a case where there is no need to secure a view of the driver in accordance with the environmental information and the driver is not in a fatigue state associated with the fatigue degree, the circuitry makes the movement speed of the optical flow faster without changing the display range of the optical flow.

* * * * *